L. E. A. KELSO.
ELECTRIC HEATER.
APPLICATION FILED APR. 12, 1911.
1,017,874.
Patented Feb. 20, 1912.
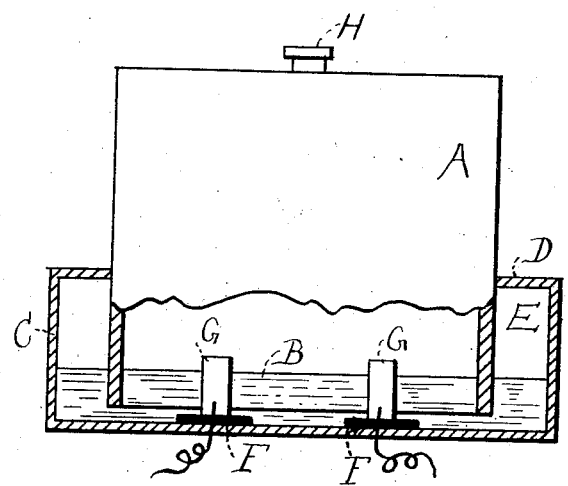
WITNESSES:
INVENTOR
L. E. A. Kelso,
BY
Edward P. Thompson
ATTORNEY

UNITED STATES PATENT OFFICE.

LESLIE E. A. KELSO, OF PROVO, UTAH.

ELECTRIC HEATER.

1,017,874.   Specification of Letters Patent.   Patented Feb. 20, 1912.

Application filed April 12, 1911. Serial No. 620,636.

*To all whom it may concern:*

Be it known that I, LESLIE E. A. KELSO, a citizen of the United States of America, and resident of Olmsted Station, Provo, in the county of Utah and State of Utah, have invented certain new and useful Improvements in Electric Heaters, of which the following is a specification.

My invention relates to an electric heater operated by an electric current passing through water.

The object of the invention is to provide a construction whereby the heat will be automatically regulated.

In a general way, the conception comprises electrodes immersed in an electrolyte, and means for causing the quantity of water between the electrodes to vary inversely as the consequent heat, thereby maintaining a practically constant temperature, the water being the most appropriate and convenient kind of electrolyte to be employed.

The figure of drawing is a partly vertical section of the structure, some portions being shown externally.

At A is a steam dome, consisting of a vessel with its mouth dipping into water B, which is held in a second vessel C, closed to the outside atmosphere by the cover D which connects the upper rim of the vessel C to the outside walls of the vessel A, for providing an air space E above the water. The vessel A does not rest on the bottom of the vessel B but is raised slightly for the purpose of permitting the water to flow either from the vessel A to the vessel C or vice versa. The plate D also forms the support for holding the vessel A at the right height.

F represents insulators for supporting electrodes G within the water inside of the walls of the vessel A.

The operation is as follows;—When an electric current is passed through the water from one of the electrodes to the other, the water is heated and the usual results occur. Sufficient current will cause the water to boil. The steam generated will occupy the space in the dome or vessel A, and its pressure, when great enough, forces some of the water into the outer vessel C, thereby leaving less water between the electrodes G. Therefore, less current passes through the electrolyte and less heat is generated; and the reverse operation ensues if heat is abstracted from the steam dome, for the pressure then becomes less, and more water comes from the vessel C to the vessel A.

The numerous uses of the heater need not be mentioned. As an instance, it may be said that the whole device may be submerged in water or other liquids for raising their temperature. To adjust the device, more water may be put in by removing the cap H.

I claim as my invention;—

In an electric heater, the combination of a vessel, water therein, a second and inverted vessel dipping into said water by which position a steam containing-dome is formed above a part of the water which is directly below the said second vessel, a cover D connecting the upper rim of the first named vessel to the outside walls of the second named vessel for providing an air space above the water which is outside of the inverted vessel, the inverted vessel being maintained elevated above the bottom of the first vessel for the purpose of permitting the water to flow from either vessel to the other under variations of steam pressure in said dome, and electrodes immersed in the water which is directly under said dome.

LESLIE E. A. KELSO.

Witnesses:
Mrs. L. E. A. KELSO,
ERNEST A. THORNHILL.